US006687775B1

(12) United States Patent
Bassett

(10) Patent No.: US 6,687,775 B1
(45) Date of Patent: Feb. 3, 2004

(54) DUAL PURPOSE SERIAL/PARALLEL DATA TRANSFER DEVICE FOR PERIPHERAL STORAGE DEVICE

(75) Inventor: Stephen J. Bassett, Fort Collins, CO (US)

(73) Assignee: Texas Instruments Incorporated, Dallas, TX (US)

( * ) Notice: Subject to any disclaimer, the term of this patent is extended or adjusted under 35 U.S.C. 154(b) by 445 days.

(21) Appl. No.: 09/724,365

(22) Filed: Nov. 28, 2000

(51) Int. Cl.[7] .............................................. G06F 13/12
(52) U.S. Cl. .......................... 710/77; 710/70; 710/71; 710/72; 710/73; 710/8; 710/62
(58) Field of Search .............................. 710/8, 70–74, 710/62

(56) References Cited

U.S. PATENT DOCUMENTS

| 5,596,562 | A |   | 1/1997  | Chen |
|-----------|---|---|---------|------|
| 5,666,530 | A | * | 9/1997  | Clark et al. .................. 707/201 |
| 5,737,364 | A | * | 4/1998  | Cohen et al. ............... 375/220 |
| 5,784,390 | A |   | 7/1998  | Masiewicz et al. |
| 5,864,715 | A | * | 1/1999  | Zani et al. ..................... 710/63 |
| 6,126,479 | A |   | 10/2000 | Lee |
| 6,323,699 | B1| * | 11/2001 | Quiet .......................... 327/108 |
| 6,460,094 | B1| * | 10/2002 | Hanson et al. ................. 710/8 |
| 6,542,946 | B1| * | 4/2003  | Wooten ....................... 710/106 |

* cited by examiner

*Primary Examiner*—Jeffrey Gaffin
*Assistant Examiner*—Justin Knapp
(74) *Attorney, Agent, or Firm*—W. Daniel Swayze, Jr.; W. James Brady; Frederick J. Telecky, Jr.

(57) ABSTRACT

A peripheral storage device system and a data transfer device for use in a peripheral storage device system are disclosed, which provide for selective information transfer between a peripheral storage device, such as a disk drive, a CDROM drive, or a tape drive, and a host computer in a serial or parallel data format. A cable connector and cable assembly are disclosed for connecting the peripheral storage device system with the host computer, whereby serial data transfer may be accomplished via an ATA connector on one or both of the peripheral storage device and the host computer. In addition, a methodology is disclosed for transferring data between a peripheral storage device and a host computer in one of a serial and a parallel data format.

28 Claims, 14 Drawing Sheets

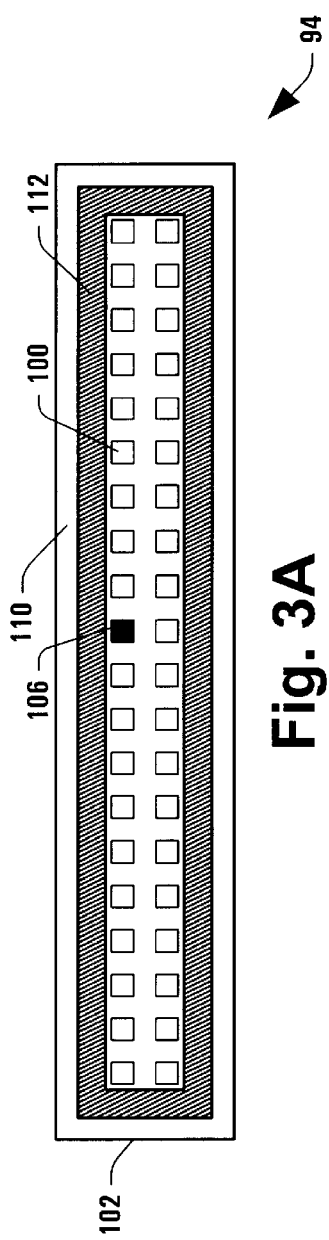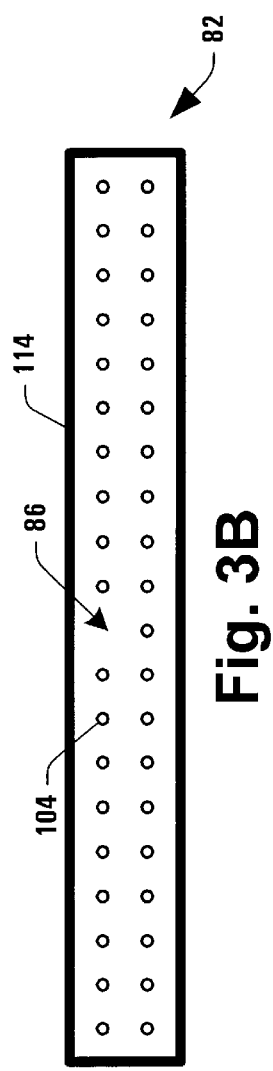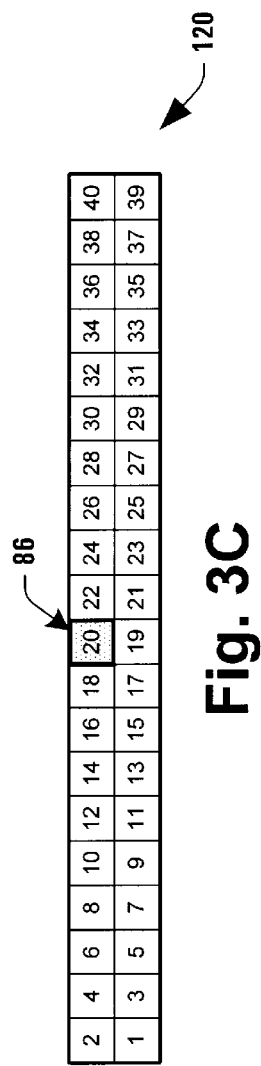

| CONTROL SIGNAL 310 | OPERATION | PIN 15 | PIN 16 | PIN 17 | PIN 18 |
|---|---|---|---|---|---|
| FIRST CONTROL STATE | SINGLE-ENDED PARALLEL BI-DIRECTIONAL DATA TRANSFER | DD1 | DD14 | DD0 | DD15 |
| SECOND CONTROL STATE | DIFFERENTIAL SERIAL BI-DIRECTIONAL DATA TRANSFER | D1+ | D1- | D0+ | D0- |

Fig. 14

DUAL PURPOSE SERIAL/PARALLEL DATA TRANSFER DEVICE FOR PERIPHERAL STORAGE DEVICE

TECHNICAL FIELD

The present invention relates to peripheral storage devices and, more particularly, to a dual purpose serial/parallel data transfer device for use with a peripheral storage device.

BACKGROUND OF THE INVENTION

Peripheral storage devices have become a standard feature in most computer systems. Such devices provide mass storage functionality for a host computer, and may include hard disk drives, CDROM drives, tape drives, and the like. For example, hard disk drives include one or more magnetically coated platters used for storing program instructions, data, and other information used by the computer system. One or more such platters may be configured in a stack, which may be rotated by a spindle or servo motor. A space is provided between each platter to allow an arm having a read/write head to be positioned on each side of each platter such that information may be stored and retrieved. Information may be stored on one or both sides of the platters, which are generally organized into sectors, tracks, zones, and cylinders.

The read/write heads may be mounted onto one or more suspension arms whereby each of the read/write heads may be positioned as desired. The suspension arms may be coupled together at a voice coil motor (VCM) to form one unit or assembly that is positionable by the voice coil motor. The voice coil motor positions the suspension arms so that an active read/write head is properly positioned for reading or writing information. The read/write heads may thus be positioned between an inner diameter and an outer diameter of the platters in a controlled fashion to access data stored thereon.

Hard disk drives and other peripheral storage devices also include a variety of electronic control circuitry for processing data and for controlling its overall operation, including a hard disk controller. For example, the controller may include a processor, a pre-amplifier, a read channel, a write channel, a servo controller, a motor control circuit, a read-only memory (ROM), a random-access memory (RAM), and a variety of disk control circuitry to control the operation of the hard disk drive and to properly interface the hard disk drive to a bus in a host computer system. The disk control circuitry generally includes a processor (e.g., a DSP, microprocessor, microcontroller, or the like) for executing instructions stored in memory to control the operation and interface of the hard disk drive.

The peripheral storage device performs write, read, and servo operations when storing and retrieving data. Generally, a write operation includes receiving data from a system bus and storing the data on the platters. In a read operation, the appropriate sector to be read is located and data that has been previously written to one or more platters is read. The data is then provided to the host computer system. The disk drive may further comprise some form of buffer memory to buffer or temporarily store information on its way from the host system to the storage media (platters) and/or on its way from the media to the host system. In addition, the control circuitry may include instruction memory (e.g., ROM, EEPROM, FLASH, and the like) used for storing firmware instructions for execution by the controller processor, and execution memory (e.g., SRAM) used for storing temporary variables, intermediate results, and the like (scratchpad).

Such peripheral storage devices are typically provided with a parallel data interface for interconnection with a host computer system. One popular form of parallel interface is known as the integrated drive electronics (IDE), sometimes also referred to as intelligent device electronics, and is widely used to connect hard disk drives, CDROM devices, tape drives, and the like to personal computers. This parallel interface employs a forty pin AT attachment (ATA) connector providing interconnection of sixteen bi-directional data lines and various handshaking or interface control signals between the disk drive system and the host computer. Separate cable connections may be provided therebetween in order to supply the disk drive system with power from the host computer.

While the parallel ATA/IDE interface has become a widely used standard in the computer disk drive industry, other forms of interconnection are being developed. For instance, high speed serial interfaces are being considered. However, where two or more interfaces are being used in the marketplace, it may be desirable to provide for universal interconnectivity between disk drives and/or host computers having one or both interfaces. Thus, there is a need for improved apparatus and methodologies for interfacing disk drive systems with host computers having support for multiple interface types.

SUMMARY OF THE INVENTION

The present invention provides a peripheral storage system and a data transfer device for use in such a system, which provide for selective information transfer between a disk drive or other peripheral storage device and a host computer in a serial or parallel data format. The invention further comprises a cable connector and cable assembly for connecting a dual function peripheral storage device with the host computer, whereby serial or parallel data transfer may be accomplished using differential or single-ended formats. The cable connector and cable assembly may be employed to connect with such devices using an ATA type connector on one or both of the peripheral storage device and the host computer, whereby a single cable having cable connectors on both ends may be employed to interconnect with devices including an ATA type connector as well as devices with other types of connectors. In addition, the invention provides a methodology for transferring data between a peripheral storage device and a host computer in one of a serial and a parallel data format as well as in one of a single-ended format and a differential format.

The invention thus provides for dual function (e.g., serial and parallel interface capable) peripheral storage device systems by the employment of a data transfer device in the peripheral storage device system. The data transfer device may also be employed in a host computer system to provide serial and parallel data transfer capability therein. The data transfer device may be adapted to interface serial and/or parallel data via a standard ATA type connector, or through a serial connector interface. The cable connector and cable assembly provide for connection to both such connector types, thus allowing a single cable assembly to be employed regardless of the connector types provided on the peripheral storage device and the host computer. In addition, the data transfer device may be adapted to operate in serial or parallel mode according to the type of cable used to interconnect the drive with the host computer. Consequently, the invention provides universal connectivity for peripheral storage device systems and host computers with serial or parallel interface capabilities.

One aspect of the invention provides a cable connector with a housing having an integer number N socket receptacles configured in a first pattern. Some of the receptacles include female sockets for interconnection with one or more signals in a male ATA or other type connector. The cable connector may be adapted to connect with the ATA connector in a single orientation, whereby proper interconnection of signals from the peripheral storage device to the host computer may be ensured. For example, a blocking device may be located in one of the socket receptacles to provide for proper interconnection with an ATA connector, which has an integer number M pins and a missing pin location, where N is less than M.

Thus, the connector, as well as cable assemblies including the connector, may be employed in interconnecting serial peripheral storage devices with serial host computers where one or both include an ATA connector. Additionally, the connector may be used to connect serial devices having connectors other than ATA types. For example, the peripheral storage device and/or the host computer may include a connector adapted for serial data transfer, which has fewer pins than the ATA connector. The connector thus facilitates cable assemblies universally applicable to devices (e.g., host computers and disk drives) having ATA or other (e.g., serial interface type) connectors. As an example, the cable connector may comprise two rows of three receptacles with one receptacle populated with a blocking device, whereby the connector may connect, in a single orientation, with an ATA type connector (e.g., on a disk drive or on a host computer) having 39 pins in a dual row pattern with a single missing pin location.

According to another aspect of the invention, the cable may provide for interconnection with four data signals of the ATA connector, through the proper placement of the blocking device. For example, a cable connector having a two row pattern with three receptacles in each row may be provided with a blocking device located in one of the corner receptacles, whereby interconnection with ATA connector positions used for data lines according to the ATA standard may be achieved.

When employed with a peripheral storage device using these connector positions for dual purpose (e.g., serial/parallel) data transfer, the peripheral storage device circuitry (e.g., such as a data transfer device according to another aspect of the invention) required to implement the dual functionality may be reduced or minimized as a result. For instance, providing serial or parallel data transfer using connector positions defined as data bits in the parallel ATA standard may be easier than providing such dual functionality with connector positions defined as non-data (e.g., handshaking) signals in the ATA standard. Thus, the employment of a blocking device minimizes or eliminates the possibility of improper connection with the peripheral storage device or host computer connector, while the location thereof in the cable connector advantageously provides for selective employment of data line connections in the multi-function data transfer circuitry.

In this regard, the invention also contemplates a cable assembly for interconnecting a peripheral storage device with a host computer which comprises a cable having a plurality of conductor wires extending between first and second ends, and at least one cable connector connected to the cable at one end thereof. The cable connector may be adapted to connect the cable to an ATA connector associated with the peripheral storage device or the host computer. In this regard, the cable connector may include N female sockets and is adapted to connect at least four data signals in the ATA connector to at least four of the conductor wires.

Another aspect of the invention provides a data transfer device for transferring information between the peripheral storage device and a host computer. The data transfer device may be employed in a peripheral storage device system in order to facilitate multi-function operation, such as serial/parallel data transfer modes. For example, the device may provide for bi-directional, single-ended parallel data transfer operation, or bi-directional, differential serial data transfer operation. The data transfer device comprises an output circuit operative to receive output information from the peripheral storage device and to selectively provide one of a single-ended output representative of the output information and a differential output representative of the output information to the host computer according to a control signal. In addition, the device includes an input circuit operative to selectively receive one of a single-ended input and a differential input from the host computer according to the control signal and to provide input information representative of the single-ended or differential input to the peripheral storage device.

The data transfer device may be advantageously employed in a peripheral storage device system having a single ATA type connector, to provide for both serial and parallel data transfer functionality. This allows peripheral storage device systems to be interfaced with host computers having one or the other (e.g., or both) of serial and parallel data transfer capabilities. The invention accordingly facilitates the provision of universally applicable peripheral storage device systems. In this regard, the multi-purpose cable connectors and cable assemblies of the invention may further facilitate such universal connectivity.

Yet another aspect of the invention provides a peripheral storage device system for providing information storage for a host computer, which may advantageously implement two or more modes of operation (e.g., serial and/or parallel data transfer modes). The drive system comprises a peripheral storage device operative to store information from the host computer, a host interface operative to provide electrical communication between the peripheral storage device and the host computer, and a data transfer device associated with the host interface and operative to selectively transfer information between the peripheral storage device and the host computer in one of a serial format and a parallel data format.

The data transfer device may comprise an output circuit operative to receive output information from the peripheral storage device and to selectively provide one of a single-ended output representative of the output information and a differential output representative of the output information to the host computer according to a control signal. In addition, the transfer device comprises an input circuit operative to selectively receive one of a single-ended input and a differential input from the host computer according to the control signal and to provide input information representative of the single-ended or differential input to the peripheral storage device.

According to still another aspect of the invention, a methodology is provided for transferring data between a peripheral storage device and a host computer in one of a serial format and a parallel format. The method comprises providing a data transfer device in the peripheral storage device, and selectively transferring information between the peripheral storage device and the host computer in one of a serial format and a parallel format according to a control signal using the data transfer device. The method may further comprise receiving output information from the peripheral storage device and selectively providing one of a single-ended output representative of the output information and a differential output representative of the output information to the host computer according to a first control signal using the data transfer device. In addition, the method may include selectively receiving one of a single-ended input and a differential :input from the host computer according to the first control signal and to providing input information representative of the single-ended or differential input to the peripheral storage device using the data transfer device.

The method may thus be utilized in transferring data between a peripheral storage device system and a host computer, which have one or both of serial and parallel data transfer modes of operation. In addition, the method provides for transfer of such data in either single-ended or differential modes.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 3A is a front elevation view of an exemplary female ATA cable connector;

FIG. 3B is a front elevation view of an exemplary male ATA connector;

FIG. 3C is a schematic diagram illustrating a pin location configuration for an exemplary ATA connector;

FIG. 14 is a truth table associated with the exemplary data transfer device of FIG. 13.

DETAILED DESCRIPTION OF THE INVENTION

The following is a description of several aspects of the present invention with respect to the accompanying drawings in which like numbered elements represent like parts. The invention comprises a peripheral storage device system and a data transfer device for use in a peripheral device (e.g., a disk drive system, CDROM drive, taps drive, and the like), which provide for selective information transfer between a peripheral storage device and a host computer in a serial or parallel data format. In addition, a cable connector and cable assembly are provided for connecting the peripheral storage device system with the host computer, whereby serial data transfer may be accomplished via an ATA connector on one or both of the peripheral storage device and the host computer. Also, a methodology is provided for transferring data between a peripheral storage device and a host computer in one of a serial and a parallel data format. One or more aspects of the invention are illustrated and described hereinafter with respect to one or more exemplary disk drives and disk drive systems. It will be appreciated that the invention finds application in association with many forms and types of peripheral storage devices, such as disk drives, CDROM drives, tape drives, and the like.

Figure 1:
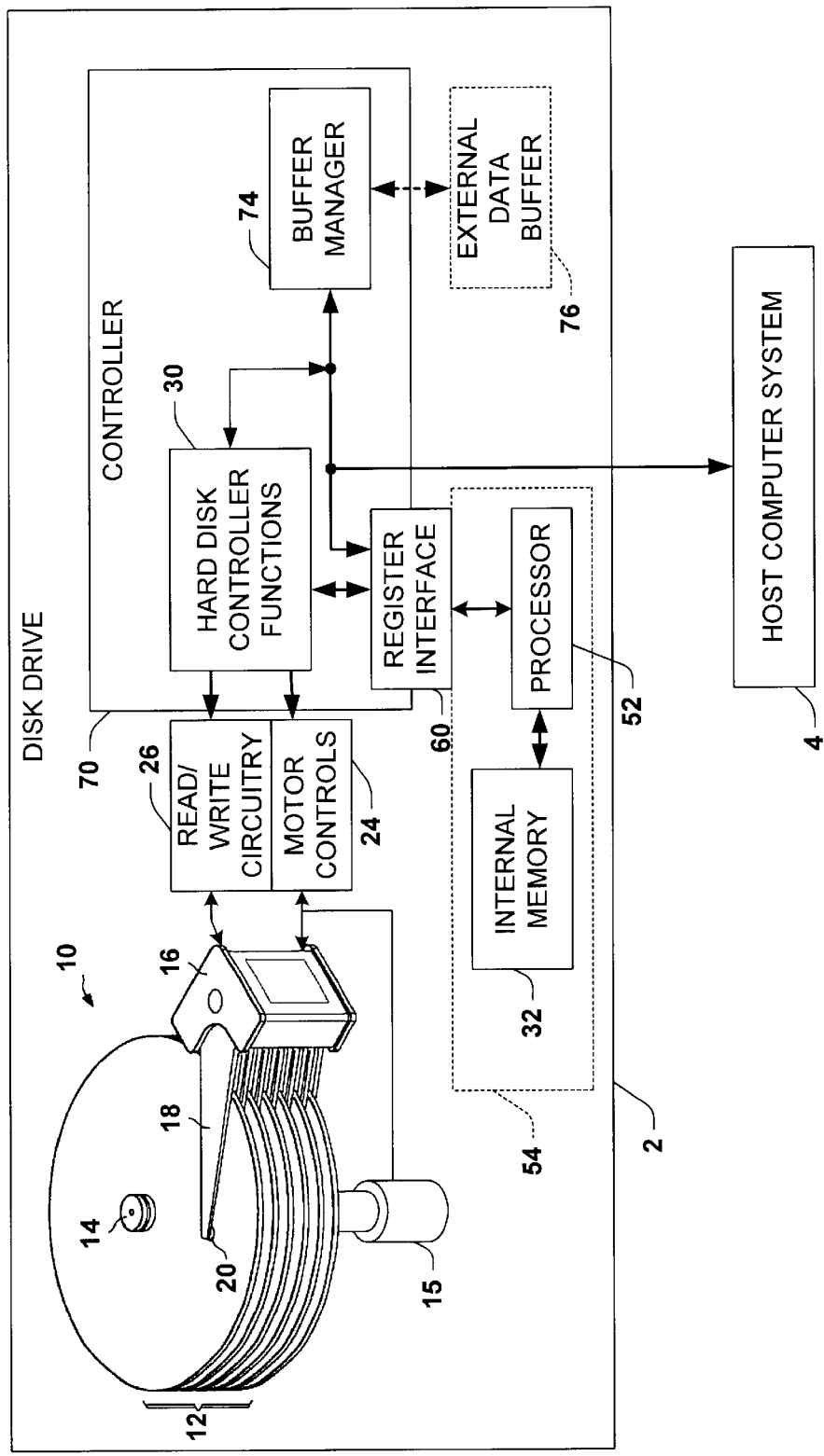
FIG. 1 is a schematic illustration of an exemplary peripheral storage device system in which one or more aspects of the present invention may be employed.

In order to provide context for the invention, FIG. 1 illustrates an exemplary disk drive system 2 adapted to provide mass storage for a host computer system 4. Information is transferred between the system 2 and the host computer system 4 in one or both of a serial and a parallel data format. The system 2 includes a disk drive 10 having a stack of magnetically coated platters 12 used for storing information from the host computer system 4. The platters 12 are mounted together in a stacked position for rotation about a platter spindle 14 via a spindle or servo motor 15. A space is provided between each platter to allow an arm 18 having a read/write head 20 associated therewith, to be positioned on each side of each platter 12 so that information may be stored and retrieved. Information is stored on each side of each platter 12 and is generally organized into sectors, tracks, zones, and cylinders (not shown).

The read/write heads 20, are mounted to one end of dedicated suspension arms 18 whereby the read/write heads 20 may be positioned in a controlled fashion. The opposite ends of the suspension arms 18 are coupled together at a voice coil motor 16 (VCM) to form one unit or assembly that is positionable by the voice coil motor 16. The voice coil motor 16 controllably positions the suspension arms 18 whereby an active read/write head 20 is positioned for reading or writing information. As illustrated and described in greater detail hereinafter, the drive 10 may also comprise electronic motor control and read/write circuitry 24 and 26, respectively, as well as a controller 70, for processing data and for performing hard disk control functions 30. The motor control circuitry 24 provides for controlled movement of the read/write heads 20 using suspension arms 18 and the voice coil motor 16, as well as for rotational movement of the platters 12 about the spindle 14 using the spindle motor 15.

The read/write circuitry 26 provides for controlling the electrical read and write operations of the read/write heads 20, and for transporting data to and from the read/write heads 20. The motor control circuitry 24 and the read/write circuitry 26 are operatively associated with the hard disk controller functions 30, which interface with a processor 52 via a register interface 60 in a processor sub-system 54. The processor 52 may comprise, for example, a microcontroller, microprocessor, digital signal processor (DSP), or other type of processor, which is adapted to perform one or more tasks according to program instructions, which may be stored in an internal memory system 32. The internal memory 32 may further be adapted for storage of temporary variable data and other information associated with the execution of a program in the processor 52, whereby a portion of the memory 32 may be employed as a processor scratchpad memory. The processor sub-system 54 may further be integrated within the controller 70.

The controller 70 may be programmed by the processor 52, for example, via one or more control registers (not shown) through the register interface 60, to operate the motor controls 24 and the read/write circuitry 26, as well as to interface with the host computer system 4 and to perform other hard disk control functions 30. The processor 52 may be adapted to execute program instructions from the memory 32 to perform various tasks associated with the operation of the disk drive 2, wherein such program instructions are created according to programming techniques as are known. The controller 70 may further comprise a buffer memory manager component 74, which is operable to interface the controller 70 with an external data buffer memory device 76. In this regard, the data buffer device 76 may be used by the controller to buffer data being transferred between the host computer system 4 and the disk drive 10, and/or for storage of program instructions to be executed by the processor 52.

Figure 2:
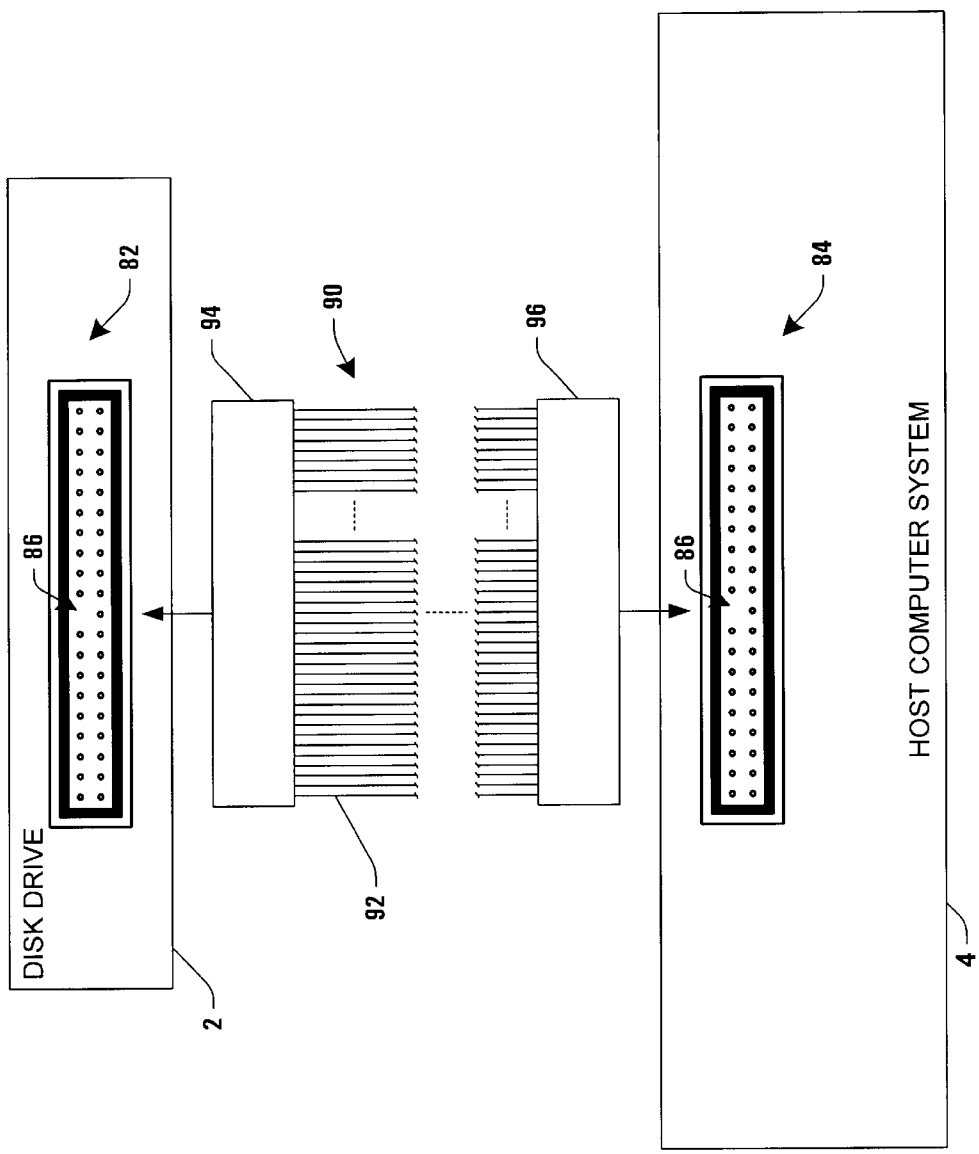
FIG. 2 is a schematic diagram illustrating interconnection of a peripheral storage device system with a host computer.

Referring to FIG. 2, an exemplary interconnection is illustrated of the disk drive system 2 with the host computer system 4. Dual-row ATA type connectors 82 and 84 are provided on the disk drive system 2 and the host computer system 4, respectively, wherein each of the connectors 82 and 84 comprised 39 pins arranged in a dual row pattern as well as a missing pin location 86. A cable assembly 90 is used to interconnect the connectors 82 and 84 of the disk drive system 2 and the host computer system 4, respectively. Cable assembly 90 comprises a multi-conductor cable 92, such as a 40 or 80 conductor ribbon cable. Female dual row cable connectors 94 and 96 are provided at opposite ends of the cable 92, whereby the cable assembly 90 may be used to interconnect one, some or all of the pins of disk drive connector 82 with corresponding pins of the host computer system connector 84.

Referring also to FIGS. 3A–3C, a front elevation view of an exemplary female connector 94 is illustrated in FIG. 3A, which may be employed to connect the cable assembly 90 to one of the dual row connectors 82 or 84. The connector 94 comprises a plurality of socket receptacles 100 located in a housing 102. The receptacles 100 may be populated alternatively with female sockets (not shown) adapted to receivingly engaged pins 104 in the exemplary male ATA connector 82 of FIG. 3B. The female sockets may be adapted to provide electrical interconnection with one or both of round pins 104 as well as square pins (not shown) such as are known. One socket receptacle 100 is populated with a blocking device 106 in a location corresponding with the missing pin location 86 of the connectors 82 and 84.

The blocking device 106 provides for interconnection of the female connector 94 with the male connector 82 in a single orientation. The connector housing 102 may further comprise a raised shroud 110 as well as a recessed channel 112, wherein the recessed channel 112 may be adapted to provide for receiving a shroud 114 on the male connector 82. Shrouds 110 and 114 as well as the recessed channel 112 may, but need not be part of the connectors 94 and/or 82. It will be appreciated that the invention provides for unambiguous interconnection with an ATA type connector (e.g., connector 82) in a single orientation while preventing other connection orientations, which may be accomplished in a variety of ways, including, but not limited to, employment of a blocking device 106.

In FIG. 3C, an exemplary pin location configuration 120 is illustrated for identifying the location of the pins 104 in the male ATA connector 82. In the configuration 120, the missing pin location 86 is provided at pin location 20, such that no pin 20 exists in the male connector 82. The corresponding female connector 94 (e.g., for use in cable assembly 90) may include the blocking device 106 located therein to correspond with the missing pin location 86 of the connector 82, whereby interconnection of the connectors 82 and 94 is achieved in a single orientation. Thus, a user is prevented from misaligning the connectors 82 and 94 laterally, or from engaging the connectors 82 and 94 upside down.

The standard ATA interface provided by the exemplary male connector 82 has thusfar been widely employed for interconnection of peripheral storage devices (e.g. hard disk drives, tape drives, CDROM drives, and the like) with host computer systems, and is adapted for parallel data transfer there between. However, where a serial transfer of information to and/or from a peripheral storage device (e.g., disk drive 2) is desired, fewer interconnection signals may be employed than are provided via the 39 pins 104 of the connector 82. For instance, four such signals may be employed to provide bi-directional, differential-mode serial data transfer, wherein two pairs of conductor wires are employed to provide bi-directional transfer of two such signals (e.g., bits of information) at a time. Other serial adaptations are possible, such as bi-directional single-ended, single bit transfer employing one signal, bi-directional differential, single bit transfer employing two signals, etc. The invention provides for connection for such a serial data cable with the male ATA connector 82, thus allowing use of dual-purpose (e.g., serial/parallel) peripheral storage devices, and/or dual-purpose host computer systems.

Figure 4B:
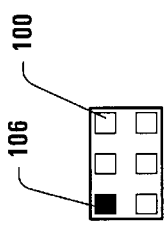
FIG. 4B is a front elevation view of an exemplary cable connector in accordance with another aspect of the invention.
Figure 4D:
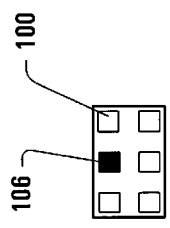
FIG. 4D is a front elevation view of another exemplary cable connector in accordance with the invention.
Figure 4F:
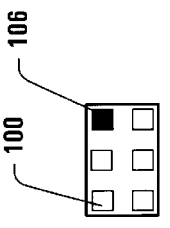
FIG. 4F is a front elevation view of another exemplary cable connector in accordance with the invention.
Figure 4A:
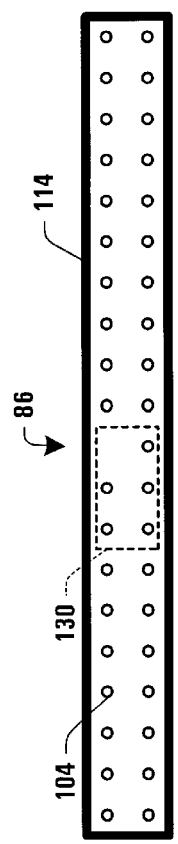
FIG. 4A is a front elevation view of the male ATA connector of FIG. 3B illustrating an exemplary connection pattern according to an aspect of the present invention.

Referring now to FIGS. 4A through 4F, several exemplary serial connection patterns are illustrated by which a serial data cable may be interconnected with the ATA connector 82. FIG. 4A illustrates the exemplary male connector 82 with one such exemplary serial connection pattern 130, which is illustrated in dashed line, and which comprises pin locations 15 through 20 (e.g., with respect to the exemplary pin location configuration 120 of FIG. 3C). The connection pattern 130 thus includes at least four pins 104 from the connector 82, as well as the missing pin location 86. This allows for bi-directional differential serial data transfer of two bits at a time.

Referring as well to FIG. 4B, an exemplary cable connector 140 is illustrated which may be advantageously interconnected with ATA connector 82 according to the connection pattern 130. The cable connector 140 comprises a blocking device 106 installed in one of six socket receptacles 100 (e.g., in one of the corner locations), thereby allowing interconnection with ATA connector 82 in a single orientation corresponding with the connection pattern 130, while preventing other connection orientations. It will be appreciated that other forms of mechanical connector alignment may be provided in accordance with the invention, in order to ensure correct interconnection of the cable connector. These may include, for example, blocking devices (e.g., blocking device 106), recessed channels in a tongue-and-groove type interconnection scheme, and the like. These and other connector alignment features are contemplated as falling within the scope of the present invention, whereby proper interconnection with an ATA type connector is ensured or facilitated.

It will be noted that according to the ATA standard signal definition, the exemplary connection pattern 130 of FIG. 4A provides for interconnection of the cable connector 140 with pins 104 corresponding to four signals defined as data (e.g., pin locations 15–18 according to the pin location configuration 120 of FIG. 3C), one grounded pin (e.g., pin 19), and the missing pin location 86. As illustrated and described further hereinafter, the exemplary connection pattern 130 may thus be used to interconnect with peripheral storage devices having dual function, serial/parallel data transfer capabilities.

Figure 4C:
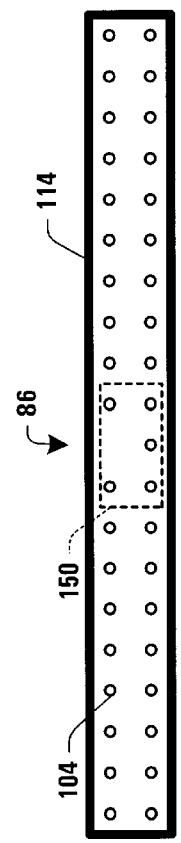
FIG. 4C is a front elevation view; of the male ATA connector of FIG. 3B illustrating another exemplary connection pattern according to the invention.
Figure 4E:
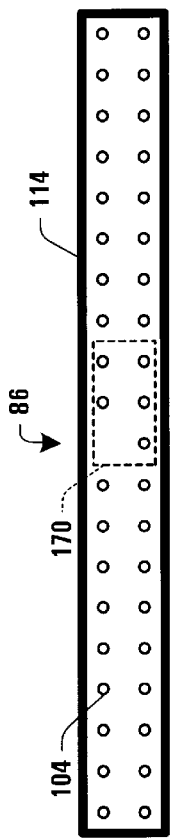
FIG. 4E is a front elevation view of the male ATA connector of FIG. 3B illustrating another exemplary connection pattern according to the invention.

Referring now to FIGS. 4C and 4D, another exemplary connection pattern 150 is illustrated in dashed line, which includes five pins 104 as well as the missing pin location 86 (e.g., thereby providing keyed interconnection in a single orientation for serial differential data transfer of two bits at a time). A corresponding cable connector 160 is illustrated in FIG. 4D having a blocking device 106 located such that interconnection with the male ATA connector 82 is provided in a single orientation corresponding with the connection pattern 150. As illustrated in FIGS. 4E and 4F, yet another exemplary connection pattern 170 is possible, which employs the missing pin location 86 of the male ATA connector 82 and at least four pins 104 thereof. A cable connector 180 may be provided to connect with the connector 82 in a single orientation corresponding with the connection pattern 170 facilitated by the location of blocking device 106 in one of six socket receptacles 100.

Referring also to FIG. 3C, it will be noted that while the connection patterns 150 and 170 of FIGS. 4C and 4E, respectively, provide for keyed interconnection of the corresponding cable connectors 160 and 180 respectively, through the inclusion therein of the missing pin location 86 and the blocking devices 106, the remaining pins 104 included within these connection patterns 150 and 170 do not provide for interfacing with at least four data signals according to the ATA standard. For instance, the connection pattern 150 of FIG. 4C provides interconnection with pin locations 17–22, which comprise two such data signals. Similarly, the connection pattern 170 of FIG. 4E includes pin locations 19 through 24, which comprise one such data signal. Thus, the exemplary connection pattern 130 illustrated in FIG. 4A may provide advantages associated with circuitry within the peripheral storage device which provides the dual-functionality (e.g., serial and/or parallel data transfer capability) wherein bi-directional differential, serial data transfer of two bits at a time may be accomplished, without having to implement dual functionality in a pin location involving data transfer in one mode and non-data (e.g., handshaking) functionality in another mode.

Figure 5A:
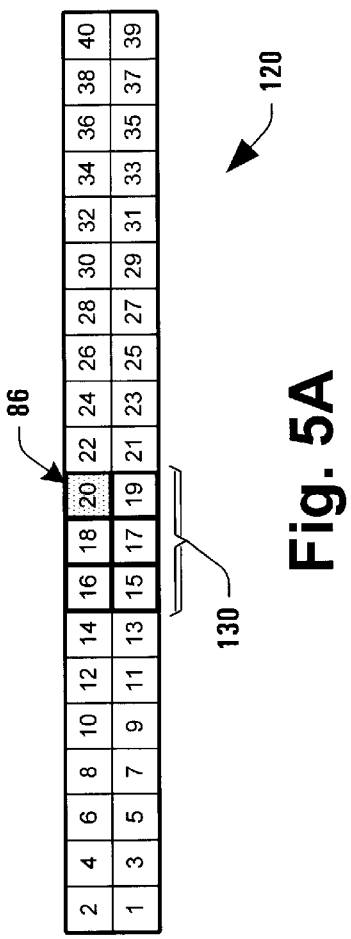
FIG. 5A is a schematic diagram of an ATA connector further illustrating the exemplary connection pattern of FIG. 4A.
Figure 5B:
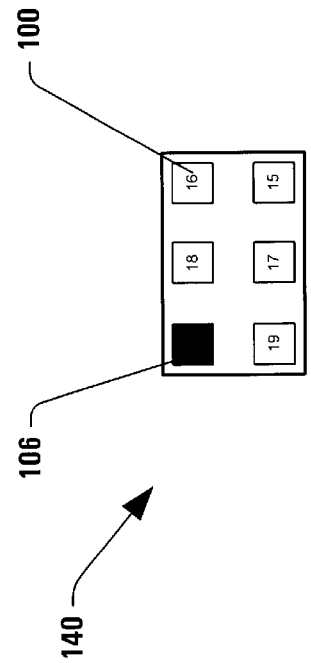
FIG. 5B is a front elevation view illustrating the connection pattern of the cable connector of FIG. 4B.

Referring briefly to FIGS. 5A and 5B, the exemplary cable connector 140 provides interconnection with pins 15 through 20 of the male ATA connector 82 according to the connection pattern 130. The corresponding connection pattern is illustrated in FIG. 5B, wherein the connector 140 provides two rows of three socket receptacles in each row. The receptacle location 20 is populated with a blocking device 106, and the remaining socket receptacles (e.g., corresponding with pin locations 15–19) are populated with female sockets (not shown) adapted for electrical interconnection with pins 104 of the ATA connector 82.

Figure 6:
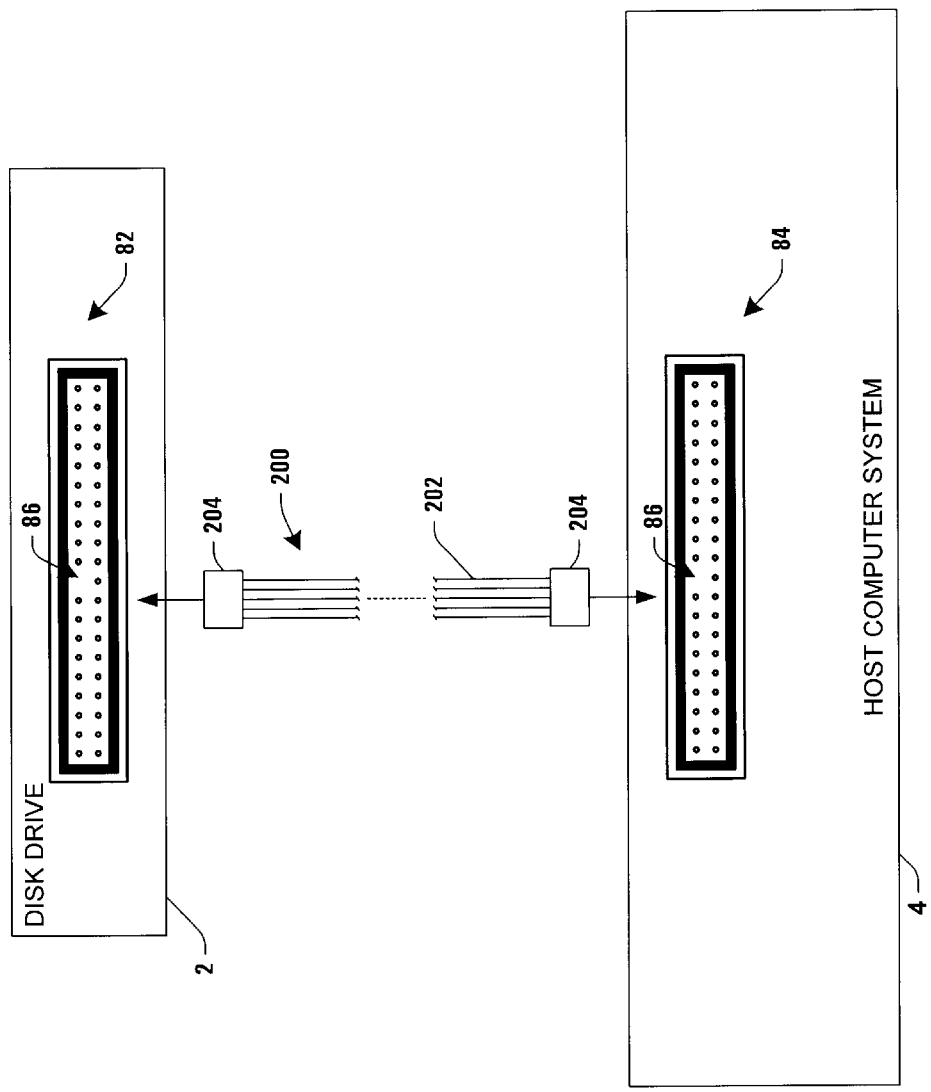
FIG. 6 is a schematic diagram illustrating an exemplary interconnection of a peripheral storage device system with a host computer using an exemplary cable according to another aspect of the invention.

Referring now to FIG. 6, an exemplary data cable assembly 200 is illustrated comprising a multi-conductor cable 202 with a plurality (e.g., 4 or 5) of conductors terminated at either end by cable connectors 204. According to another aspect of the invention, the cable assembly 200 may be employed to interconnect peripheral storage devices such as the disk drive system 2, with a host computer system 4. For example, the cable connectors 204 at either end of the cable assembly 200 may be adapted to provide interconnection with the male ATA connectors 82 and 84 associated with the disk drive 2 and the host computer system 4, respectively, according to one of the exemplary connection patterns 130, 150, or 170, as illustrated in FIGS. 4A, 4C, and 4E, respectively. Thus, the exemplary cable connector 140 may be employed at either end of the cable assembly 200 in order to advantageously utilize the missing pin location 86 of the male ATA connectors 82 and 84, as well as to provide interconnection with at least four data signals according to the ATA signal definition.

Figure 7:
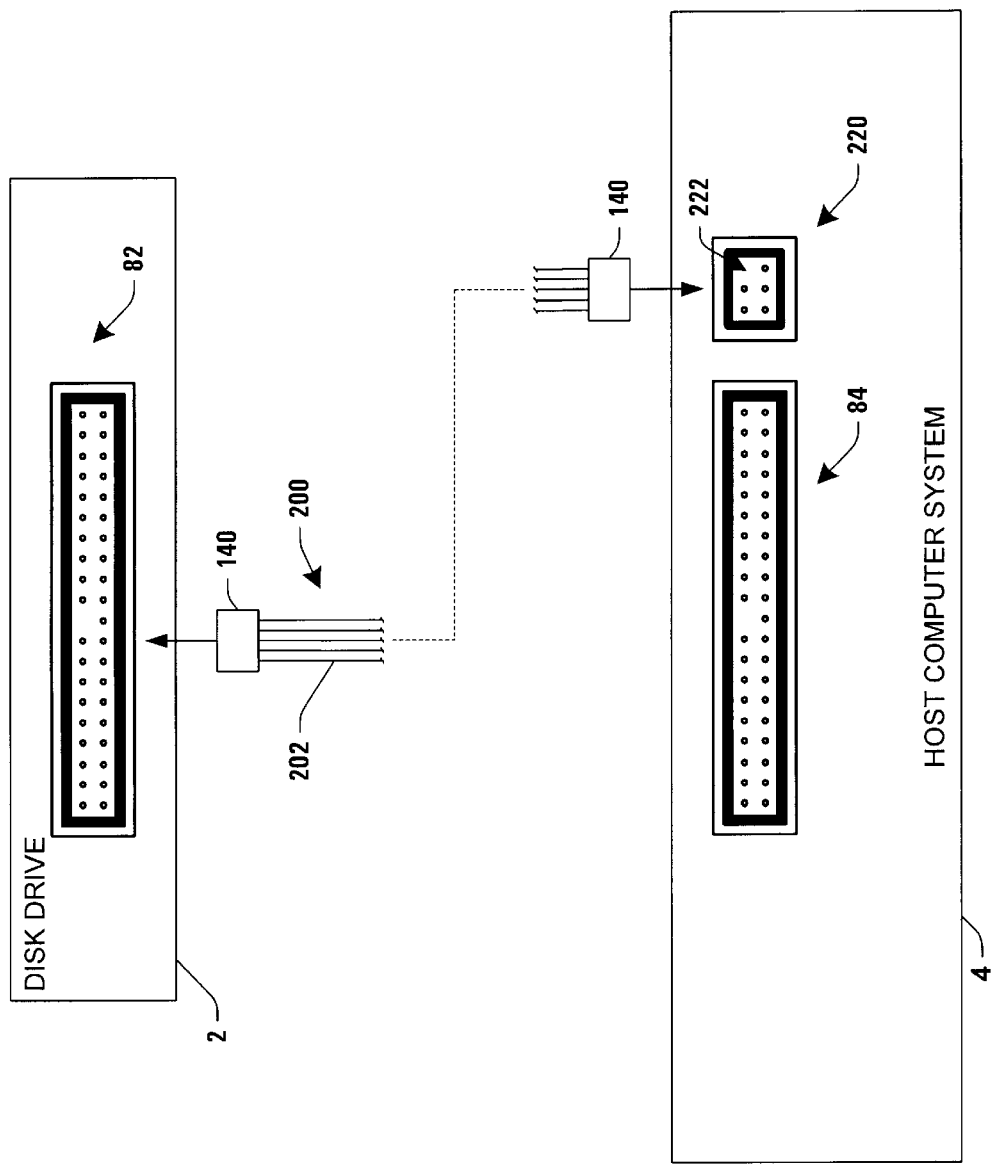
FIG. 7 is a schematic diagram illustrating another exemplary interconnection of a peripheral storage device system with a host computer using a cable according to the invention.
Figure 8:
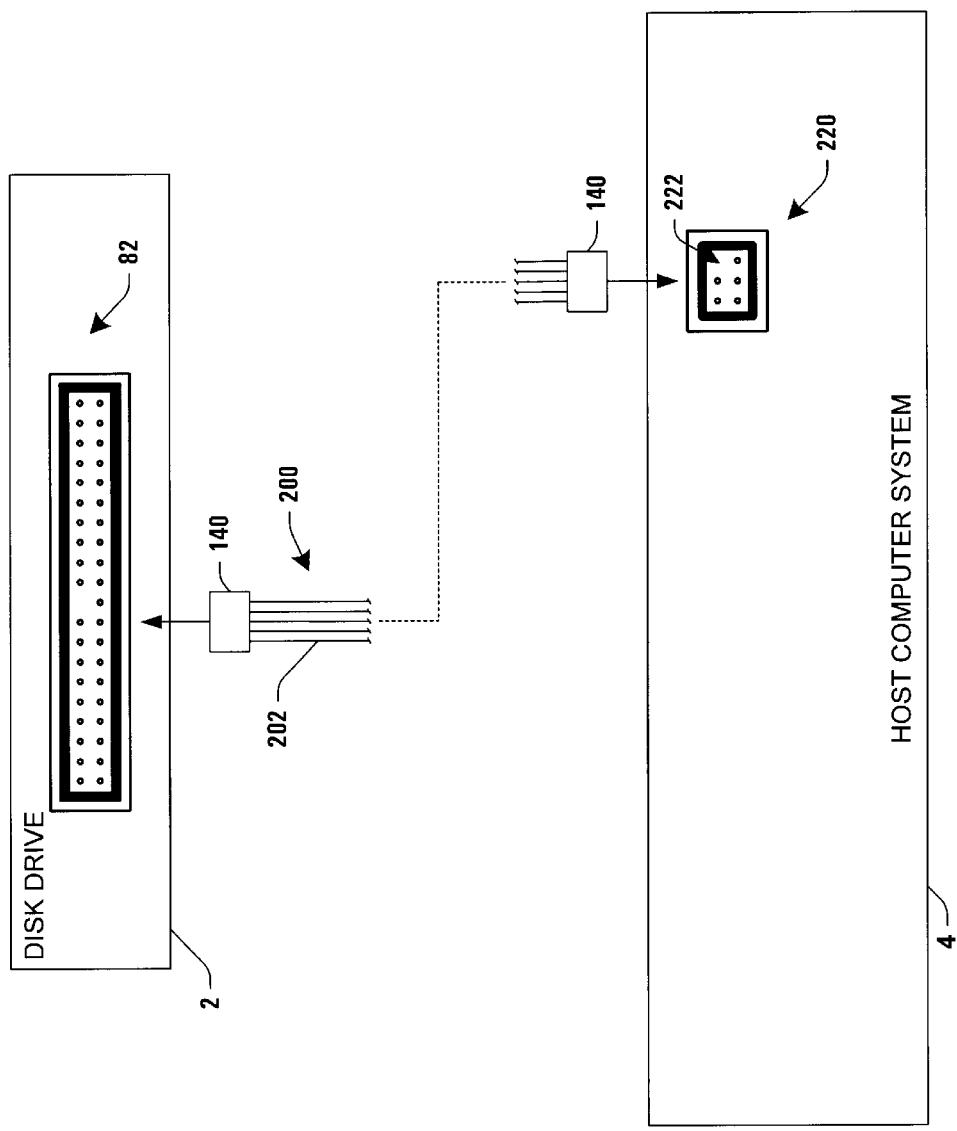
FIG. 8 is a schematic diagram illustrating yet another exemplary interconnection of a peripheral storage device system with a host computer using a cable according to the invention.
Figure 9:
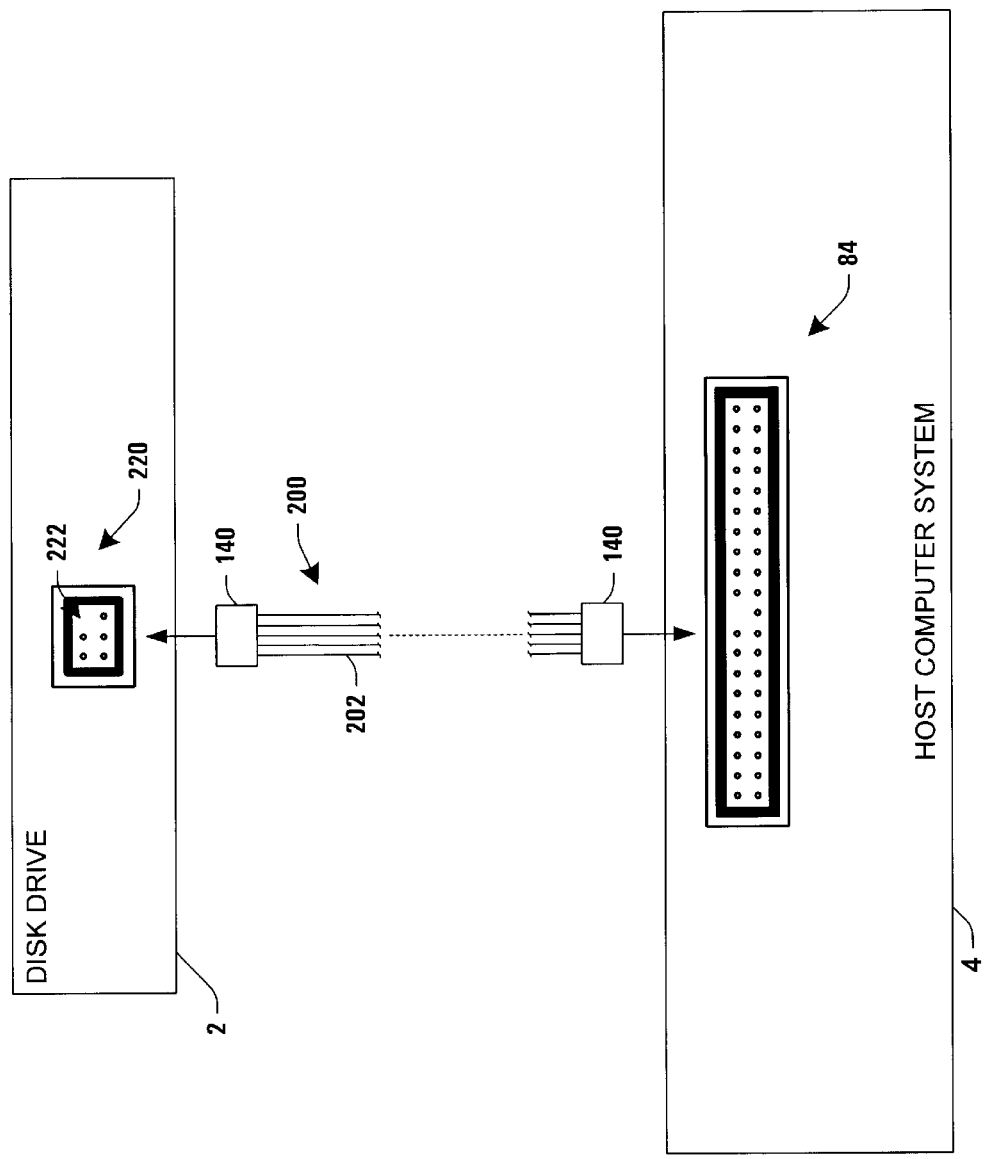
FIG. 9 is a schematic diagram illustrating still another exemplary interconnection of a peripheral storage device system with a host computer using a cable according to the invention.

Referring now to FIGS. 7 through 9, the cable assembly 200 may provide interconnection between exemplary disk drives 2 having a male ATA connector 82 and a host computer system 4 having a serial interface connector 220 with a missing pin location 222, wherein the missing pin location 222 is situated to provide interfacing with the host computer system 4 according to the exemplary 6 position connection pattern 130 of FIG. 4A. Thus, where the cable assembly 200 comprises cable connectors 140 at both ends thereof, interconnection is achieved according to the connection pattern 130 at both the male ATA connector 82 as well as the male serial connector 220. In this regard, the host computer system 4 may be adapted to allow parallel data transfer via the male ATA connector 84 as well as serial data transfer via the serial connector 220.

As illustrated in FIG. 8, the cable assembly 200 may be adapted to provide interconnection between the disk drive 2 (e.g., via the male ATA connector 82) with a host computer system 4 having the 6 position male serial connector 220 and no ATA connector. In this regard, it will be noted that the host computer 4 of FIG. 8 may further comprise a plurality of such male serial connectors 220, whereby interconnection of the host 4 may be made with more than one peripheral storage device in accordance with the invention. For example, the host 4 may be connected with disk drive 2 as well as a CDROM drive, tape drive, optical device, or other forms of storage devices, including a second hard disk drive (not shown).

In addition, as illustrated in FIG. 9, the cable assembly 200 provides interconnection with the peripheral storage device 2 having only a serial connector. For example, the disk drive 2 may include a male serial connector 220 configured to provide the exemplary connection pattern 130 via the missing pin location 222. The cable assembly 200 may thus interconnect with serial connector 220 using the exemplary cable connector 140 to provide interconnection with a host computer system 4 having a male ATA connector 84. Other interconnection combinations are possible in accordance with the invention, whereby one or more devices having dual-functionality (e.g., serial/parallel data transfer capability) may be interconnected using a universal cable assembly such as cable assembly 200.

According to another aspect of the invention, dual-functionality (e.g., serial/parallel data transfer operation) may be provided in a peripheral storage device such as the disk drive system 2. It will be recognized, moreover, that this dual-functionality may further be provided, alternatively or in combination, in a host computer system, such as computer system 4.

Figure 10:
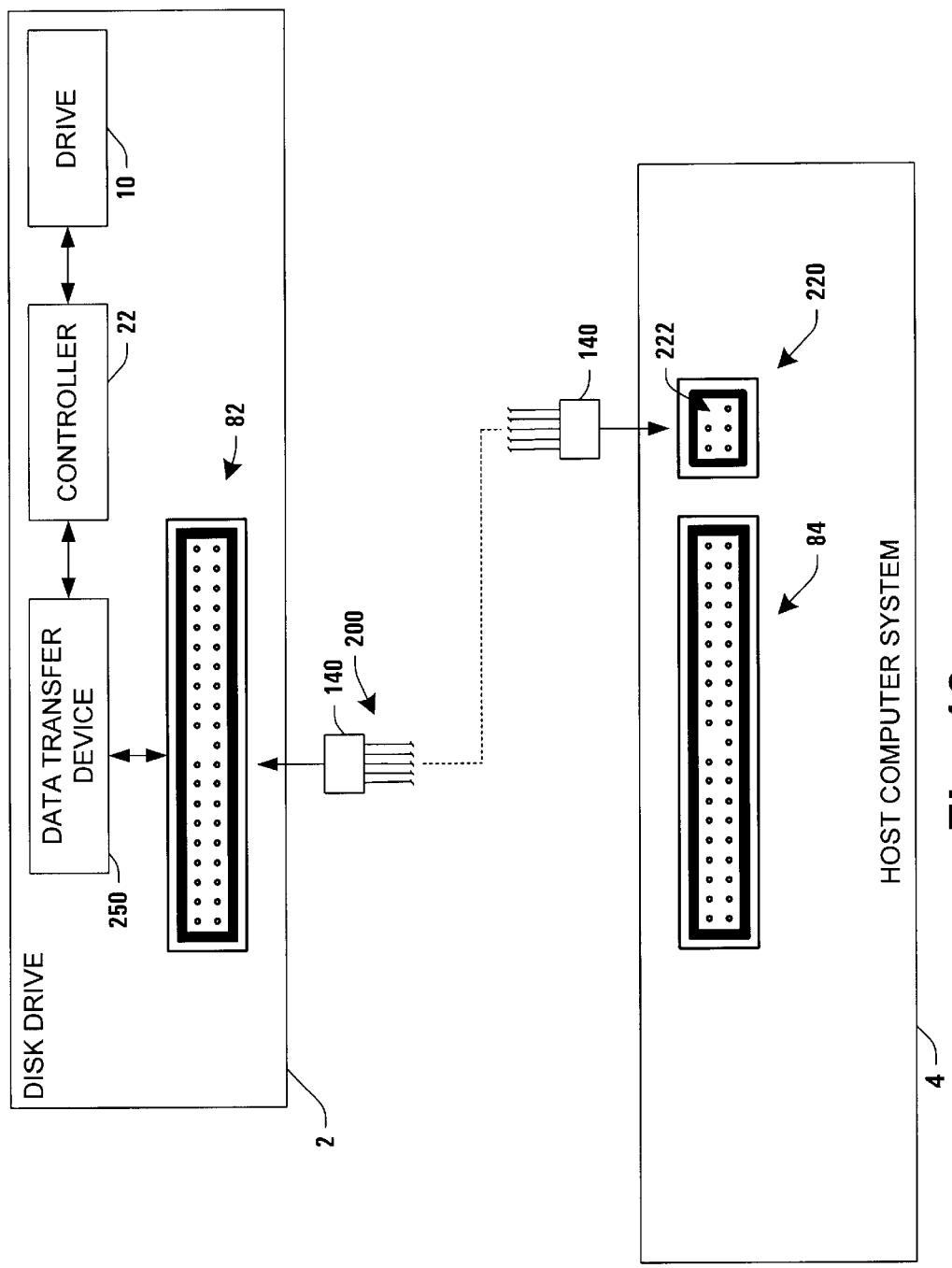
FIG. 10 is a schematic diagram illustrating a peripheral storage device system having an exemplary data transfer device according to another aspect of the invention.

Referring now to FIG. 10, the selective provision of serial or parallel data transfer between the disk drive 2 and the host computer system 4 may be achieved in the disk drive 2 through the provision of a data transfer device 250 therein. The data transfer device 250 may provide bi-directional data transfer between a controller 22 and the male ATA connector 82 associated with the disk drive 2. For example, serial data transfer may be provided using 4 of the 5 signal connections of the connection pattern 130 interfaced with the cable connector 140 of the cable assembly 200, in order to provide bi-directional, differential-mode serial data exchange, wherein two bits of information may be transferred concurrently or simultaneously. Thus, where the host computer system comprises serial data transfer capability, such as using a serial connector 220, the host computer 4 may thus store data in the disk drive 10 using the cable 200, the connector 82, the data transfer device 250, and the controller 22, in serial fashion.

Figure 11:
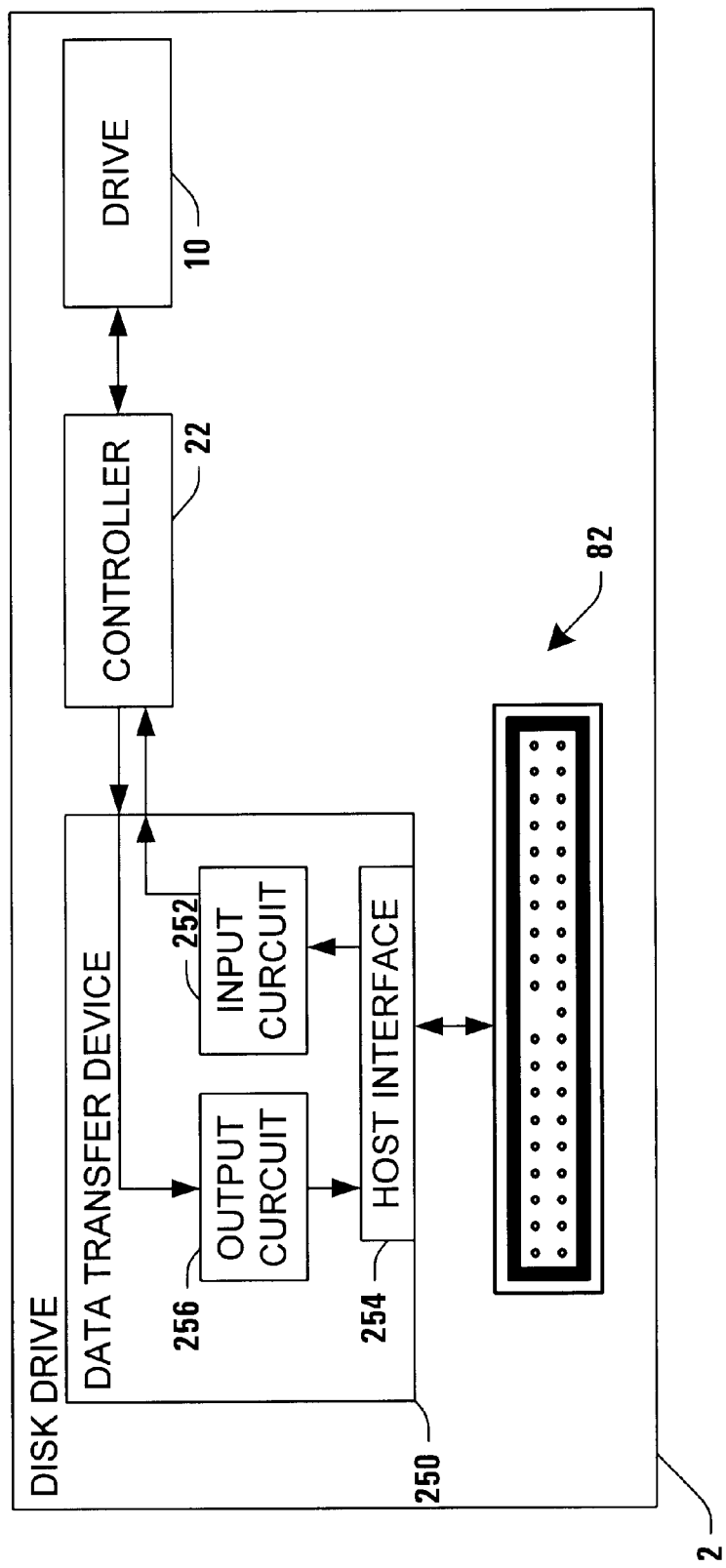
FIG. 11 is a schematic diagram further illustrating the exemplary data transfer device of FIG. 10 according to the invention.

Referring now to FIG. 11, the exemplary data transfer device 250 is further illustrated. The device 250 comprises an input circuit 252 receiving information from a host computer (e.g., host computer system 4 of FIG. 10) via a host interface 254 and the ATA connector 82, for storage of the information onto the disk drive 10 via the controller 22. The data transfer device 250 further comprises an output circuit 256 operative for transferring information from the drive 10 to the host interface 254 via the controller 22. The output circuit 256 is operative to receive output information from the drive 10 and to selectively provide either a single-ended output representative of the output information or a differential output representative of the output information to the host computer system 4 according to a control signal (not shown). In addition, the input circuit 252 is operative to selectively receive either a single-ended input or a differential input from the host computer system 4 according to the control signal, and to provide input information representative of the single ended or differential input to the drive 10 via the controller 22.

Figure 12:
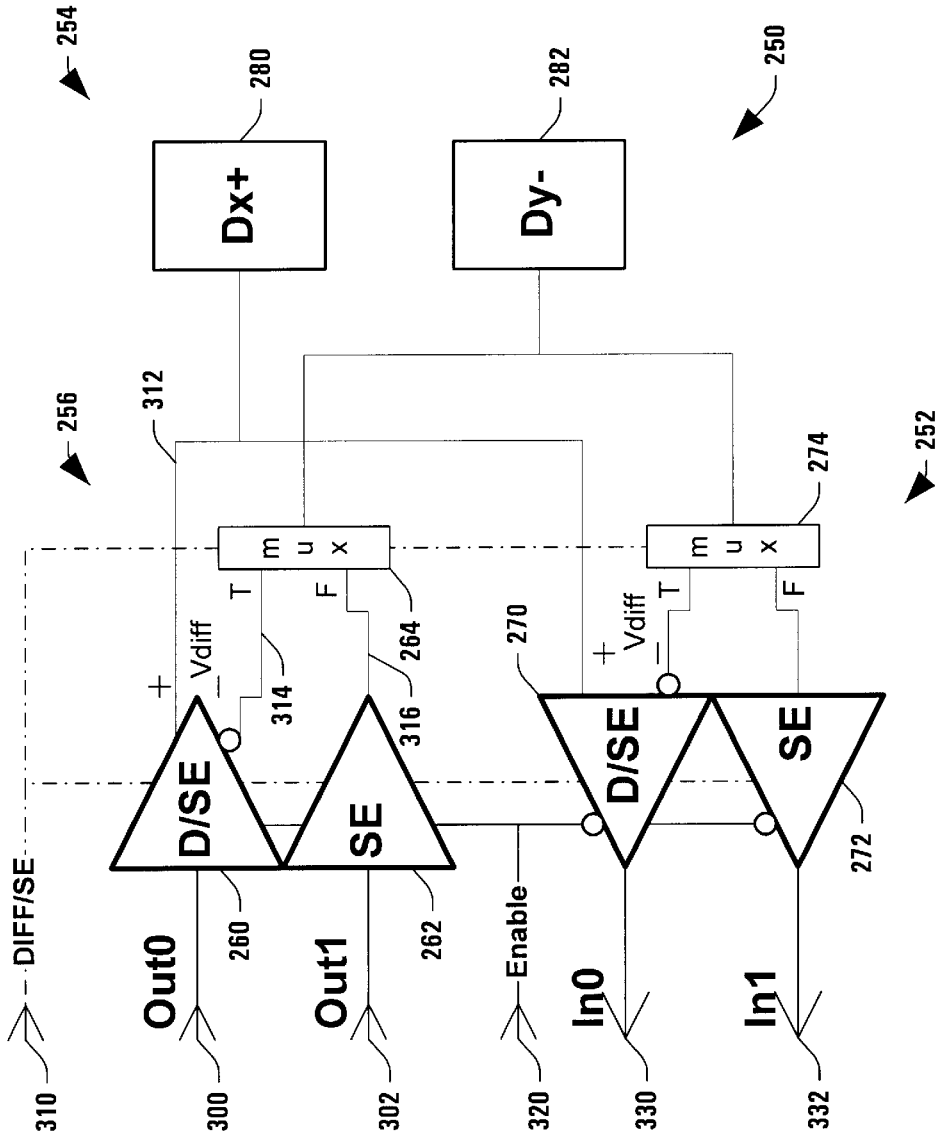
FIG. 12 is a detailed schematic diagram further illustrating the exemplary data transfer device of FIGS. 10 and 11 according to the invention.

Further details of the exemplary data transfer device 250 are illustrated in FIG. 12. The output circuit 256 comprises first and second output buffers 260 and 262, as well as a first switching circuit 264. The input circuit 252 comprises first and second input buffers 270 and 272 together with a second switching circuit 274. The host interface 254 provides connection for one or more interface circuits 280 and 282, for example, providing electrical communication between the ATA connector 82 and the input and output circuits 252 and 256. The interface circuits 280 and 282 may comprise, for example, simple circuit board traces from a controller integrated circuit pin to an interface connector (e.g., ATA type connector 82), wherein the controller IC includes the data transfer device 250.

First and second output data 300 and 302 may be provided, for example, from the controller 22 of FIG. 11 to the first and second output buffer 260 and 262, respectively. The first output buffer 260 is adapted to selectively provide a single-ended first output signal to the first host interface circuit 280, which is representative of the first output data 300, if a first control signal 310 is in a first control state. This first control state operation may correspond, for example, with single-ended parallel data transfer using the ATA connectors 82 and 84 and a 40 or 80 conductor cable connecting the disk drive 2 with the host computer system 4. The first output buffer 260 is further adapted to provide a differential first output signal representative of the first output data 300 when the first control signal 310 is in a second control state. The second control state may indicate, for example, a differential serial data transfer mode of operation. Thus, the first control signal 310 may be used to selectively provide single-ended (e.g., "SE") or differential (e.g., "DIFF") mode output signals from the output circuit 256.

When the first control signal 310 is in the second control state, the first output buffer 260 provides a differential first output signal in the form of a positive polarity signal 312 to the first host interface circuit 280, as well as a negative polarity signal 314 to the second host interface circuit 282 via the first switching device 264, which may comprise a multiplexer. When the first control signal 310 is in the second control state (e.g., "DIFF"), the first switching system 264 provides the negative polarity connection 314 to the second host interface circuit 282, whereby the output circuit 256 provides a differential first output signal to the host interface 254 representative of the first output data 300.

When the first control signal 310 is in the first control state ("SE"), (e.g., thereby selecting single-ended data transfer mode), the second output buffer 262 is operative to provide a single-ended second output signal 316 to the first switching system 264. The switching system 264 provides the signal 316 to the second host interface circuit 282. Thus, when the first control signal 310 is in the first control state, the output circuit 256 provides two single-ended signals representative of the first and second output data 300 and 302, respectively, to the host interface 254.

The selectivity provided by the first control signal 310 thus allows the output circuit 256 to provide data to the first and second host interface circuits 280 and 282 according to the first and second output data 300 and 302 in single-ended mode. In this manner, a peripheral storage device including the data transfer device 250 may implement parallel data transfer, for example, according to the ATA standard. To support this parallel single-ended data transfer operation, the first output buffer 260 is operative to provide the single-ended first output signal representative of the first output data 300 to the first host interface circuit 280 when the first control signal 310 is in the first control state. Similarly, the second output buffer 262 is operative to provide a single-ended second output 316 to the second host interface circuit 282 via the switching system 264, which is representative of the second output data 302 when the first control signal 310 is in the first control state.

Alternatively, when the first control signal 310 is in the second control state (e.g., indicating differential output mode), serial data may be provided to the data transfer device 250 (e.g., from the controller 22) as the first output data 300. In this case, the first output buffer 260 is operative to provide a differential first output signal representative of the first output data 300, wherein a positive polarity differential output signal 312 is provided to the first host interface circuit 280 and a negative polarity differential signal 314 is provided to the second host interface circuit 282 via the first switching system 264.

The exemplary data transfer device 250, furthermore, provides for bi-directional data transfer. In this regard, it will be appreciated that a second control signal 320 may be provided, whereby the output circuit 256 is operative to provide single-ended and/or differential output signals to the host interface 254 if the second control signal 320 is in an output state, and wherein the input circuit 252 is operative to provide input data from the host interface 254 to the controller 22 if the second control signal 320 is in an input state.

The input circuit 252 is operative according to the first signal 310 to selectively provide single-ended or differential mode data transfer from the host interface 254 to the controller 22 (e.g. according to the first and second control signals 310 and 320, respectively). For instance, where the second control signal 320 is in the input state, and where the first control signal 310 is in the first control state (e.g. indicating single-ended data transfer mode), the first input buffer 270 may receive a first single-ended input from the first host interface circuit 280 and to provide a first input data 330 (e.g., to the controller 22) representative of the first single-ended input.

In addition, the second input buffer 272 may receive a second single-ended input from the second host interface circuit 282 via the second switching system 274 when the first control signal 310 is in the first control state. In this case, the second input buffer 272 is operative to provide a second input data 332 representative of the second single-ended input (e.g., to the controller 22). Thus, where single-ended parallel data transfer is desired (e.g., according to the ATA standard), the input circuit 252 supports this mode of operation according to the first and second control signals 310 and 320, respectively.

Where serial data transfer is desired, a differential input may be received from the host computer system 4 having a positive polarity signal and a negative polarity signal associated therewith. The positive and negative polarity signals may be received via the first and second host interface circuits 280 and 282, respectively, which are then provided to the first input buffer 270 using the second switching system 274. In this case, the first input buffer 270 is operative to provide the first input data 330 representative of the differential input if the first control signal 310 is in the second control state.

The data transfer device 250 thus provides for a multi-function data interface. The device 250 may be advantageously employed, for example, in a peripheral storage device such as a disk drive, a tape drive, a CDROM drive, and the like. In addition, it will be appreciated that the data transfer device 250 may further be employed in a host computer system (e.g., host computer 4), whereby selective serial and/or parallel data transfer operation may be achieved using a single data connector (e.g., ATA type connectors 82 and/or 84). The data transfer device 250 further provides support for differential signal transfer in the case of serial transfer mode.

It will be appreciated that a device (e.g., a peripheral storage device or a host computer) which includes the exemplary data transfer device 250 may be universally employed in combination with other devices having one or both serial or parallel data transfer capabilities. This universal applicability may further be facilitated through employment of the exemplary cable connectors and cable assemblies provided by the invention, as illustrated and described hereinabove.

Figure 13:
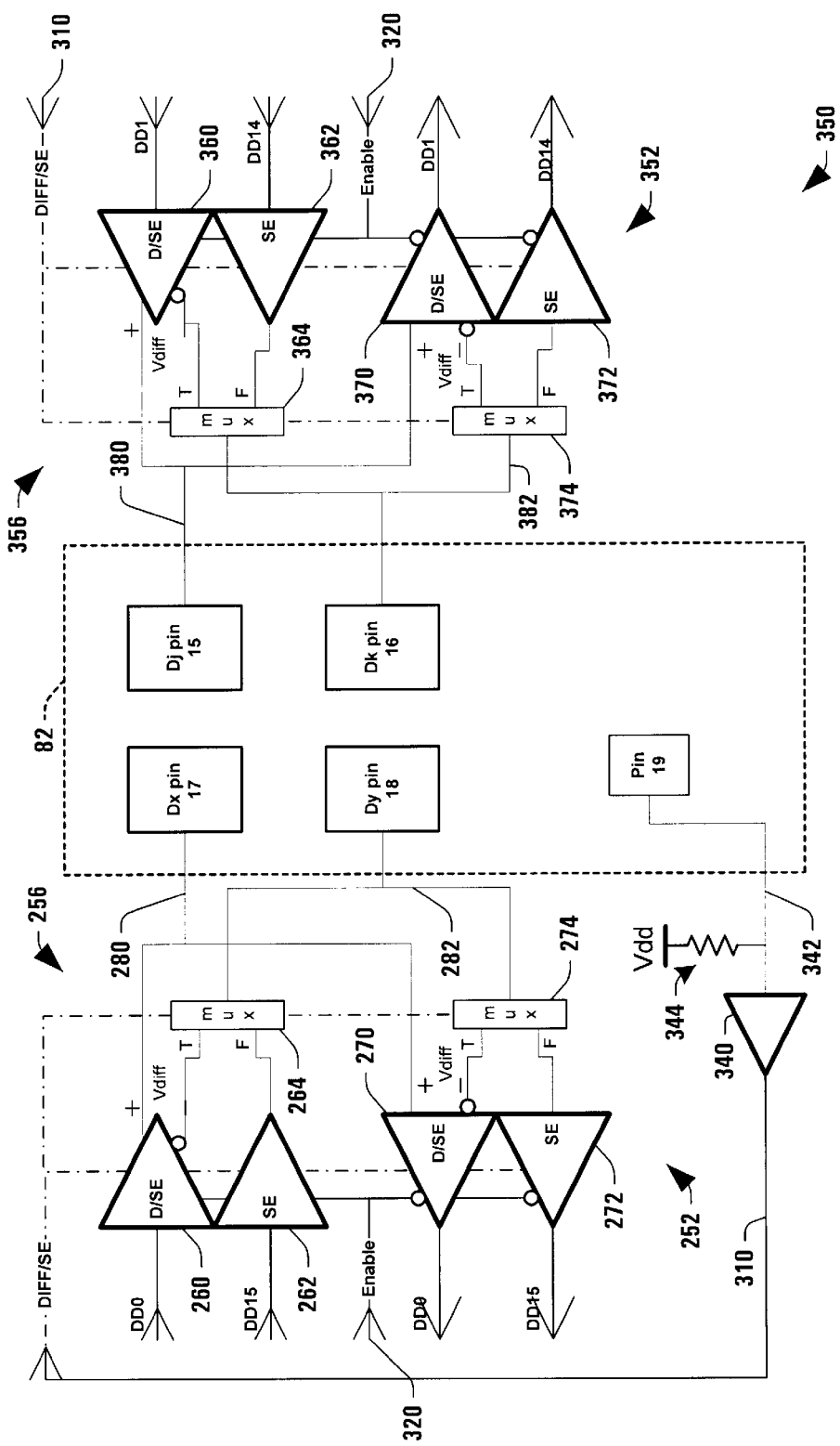
FIG. 13 is a schematic diagram illustrating another exemplary data transfer device according to the invention.

Referring now to FIG. 13, the exemplary data transfer device 250 may be operatively connected with a standard ATA type connector 82 so as to provide multi-function data transfer operation in a peripheral storage device or a host computer system. The connection of the device 250 with the connector 82, moreover, may be done according to one of the exemplary connection patterns 130, 150, or 170 illustrated in FIGS. 4A, 4C, and 4E, respectively. For example, the interconnection of FIG. 13 illustrates an application of the exemplary connection pattern 130, wherein pins 17 and 18 are operatively connected with the first and second host interface circuits 280 and 282, respectively. It will be further appreciated that host interface 254 may comprise one or both of the ATA connector 82, a serial connector (e.g., connector 220 of FIG. 9), or alternatively may be separate therefrom.

According to another aspect of the invention, the first control signal 310 may be provided by a buffer amplifier 340 having an input 342 connected with pin 19 of the connector 82. A pull up resistor 344 may be used to selectively provide one of the first control state and the second control state for the first control signal 310 according to whether pin 19 of the connector 82 is grounded or floating.

For example, according to the ATA standard, pin 19 may be grounded in a host computer system (e.g., system 4). In this case, the first control signal 310 may be in the first control state, whereby the data transfer device 250 provides for parallel signal-ended data transfer operation between the controller 22 and the host interface 254. Alternatively, where pin 19 is floating (e.g., such as where a serial cable assembly is connected with connector 82 having no conductor wire associated with pin 19), the first control signal 310 may be in a second control state (e.g., wherein serial differential mode data transfer is desired).

Thus, where the first control signal 310 is adapted to sense whether pin 19 is grounded or floating, the exemplary serial data cable assembly 200 may advantageously provide no connection for pin 19, so as to allow the automatic selection of serial differential or parallel single-ended data transfer modes via the buffer amplifier 340. Furthermore, the automatic control state selection allows a pair of dual-functionality devices (e.g., disk drive 2 and host computer system 4) to be interconnected with an ATA data cable for parallel single-ended data transfer operation, or with a serial data cable (e.g., cable assembly 200) for serial differential data transfer operation, without any reconfiguration of the devices.

It will be noted at this point that the data transfer device 250 may be employed in a host computer system (e.g., host computer system 4) as well as in a peripheral storage device. Thus, data transfer device 250 may be employed in both a disk drive (e.g., disk drive system 2) as well as in a host computer system 4 operatively connected with the disk drive 2 via a serial data cable (e.g., cable 200) or a standard ATA type cable having dual-row 40 pin connectors at either end. The provision of the buffer 340 and the pull up resistor 344 thus advantageously provides for automatic configuration of the data transfer device 250 according to the desired data transfer functionality as determined by the cable employed in a particular system.

It will be appreciated that other forms of interface configuration are possible beyond the use of pin 19, and that these other configuration techniques are deemed as falling within the scope of the present invention. The usage of pin 19 in the ATA type connector interface may be advantageous, since this pin is grounded in a parallel cable and may be floating in a serial type cable (e.g., cable 200). In addition, it is noted that pin 19 is proximate to four signals defined as data lines in the ATA pin location configuration, as well as proximate to the missing pin location. Other approaches may include, for example, the peripheral storage device (e.g., drive 2) may sense a control line (not shown) for expected signaling drive from a host (e.g., host 4), wherein the storage device may condition the data transfer device (e.g., device 250) depending on whether or not the expected signaling was observed (e.g., via control signal 310).

As further illustrated in FIG. 13, a second data transfer device 350 may be employed to provide a second serial/parallel, differential/single-ended interface between connector pins 15 and 16 of the ATA connector 82 and a peripheral storage device. The data transfer device 350 operates in a fashion similar to that of the exemplary data transfer device 250 as illustrated and described with respect to FIG. 12. In this regard, the data transfer device 350 comprises an output circuit 356 including first and second output buffers 360 and 362 as well as a first switching system 364 to provide output interfacing between the peripheral storage device and first and second host interface circuits 380 and 382. In addition, the data transfer device 350 comprises an input circuit 352 including first and second input buffers 370 and 372 as well as a second switching system 374.

The functionality of the data transfer device 250 and 350 of FIG. 13 is further illustrated in the table 400 of FIG. 14. Thus, in the configuration illustrated in FIG. 13, four electrical connections with the ATA connector 82 may be employed for serial data transfer of two differential data bits simultaneously using pins 15 and 16 of connector 82 for positive and negative first differential signals, and pins 17 and 18 for positive and negative second differential signals when the first control signal 310 is in the second control state. Alternatively, when the first control signal 310 is in the first control state, pins 15–18 will be provided with four bits of parallel data according to the normal ATA standard operation.

It will be appreciated that although the invention has been illustrated and described and above in association with the ATA type connectors as well as pin assignments associated with ATA devices, that the invention provides for selective data transfer in one or more modes (e.g., serial/parallel, single-ended/differential), which may be implemented according to protocols and configurations other than the ATA standard. In addition, the invention finds the application in association with connections other than the ATA type connections illustrated herein, as well as in association with single-ended serial data transfer modes, differential parallel transfer modes, and unit directional data transfer modes of operation.

Although the invention has been illustrated and described with respect to a certain implementation or implementations, it will be appreciated by those skilled in the art that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several implementations or applications of the invention, such feature may be combined with one or more other features of the other implementations as may be desired and advantageous for any given or particular application. Furthermore, to the extent that the term, "includes", "has", "having", and/or variants thereof are used in either the detailed description or the claims, such terms are intended to be inclusive in a manner similar to the terms "comprises" and "comprising".

What is claimed is:

1. In a peripheral storage device, a data transfer device for transferring information between the peripheral storage device and a host computer, comprising:

an output circuit operative to receive output information including first and second output data from the peripheral storage device and to selectively provide one of a single-ended output representative of the output information and a differential output representative of the output information to the host computer according to a first control signal; and an input circuit operative to selectively receive one of a single-ended input and a differential input from the host computer according to the first control signal and to provide input information representative of the one of a single-ended input and a differential input to the peripheral storage device, wherein the output circuit comprises first and second output buffers operative to receive the first and second output data, respectively, from the peripheral storage device and to provide first and second output signals representative of the first and second output data, respectively, according to the first control signal and wherein the input circuit comprises first and second input buffers operative to receive first and second input signals, respectively, and to selectively provide single-ended and differential input data representative of the first and second input signals, respectively, to the peripheral storage device according to the first control signal.

2. The data transfer device of claim 1, wherein the output circuit is operative to selectively provide one of a single-ended output representative of the first and second output data and a differential output representative of the first output data according to the first control signal.

3. The data transfer device of claim 2, wherein the input information comprises one of single-ended input data and differential input data, and wherein the input circuit is operative to selectively provide one of the single-ended input data representative of the single-ended input and the differential input data representative of the differential input according to the first control signal.

4. The data transfer device of claim 3, wherein the first control signal comprises one of a first control state and a second control state;

wherein the output circuit is operative to provide the single-ended output representative of the first and second output data if the first control signal is in the first control state, and to provide the differential output representative of the first output data if the first control signal is in the second control state; and wherein the input circuit is operative to provide the single-ended input data representative of a single-ended input if the first control signal is in the first control state, and to provide the differential input data representative of a differential input if the first control signal is in the second control state.

5. The data transfer device of claim 4, wherein the first control signal is provided by a host interface operative to provide electrical communication between the data transfer device and the host computer.

6. The data transfer device of claim 1, wherein the input information comprises one of single-ended input data and differential input data, and wherein the input circuit is operative to selectively provide one of the single-ended input data representative of the single-ended input and the differential input data representative of the differential input according to the first control signal.

7. The data transfer device of claim 1, wherein the first output buffer is operative to provide a single-ended first output signal representative of the first output data if the first control signal is in the first control state, and a differential first output signal representative of the first output data when the first control signal is in the second control state, and wherein the second output buffer is operative to provide a single-ended second output signal representative of the second output data if the first control signal is in the first control state.

8. The data transfer device of claim 7, further comprising a host interface having first and second interface circuits operative to provide electrical communication between the data transfer device and the host computer, and wherein the output circuit comprises a first switching circuit operative according to the first control, signal to provide the single-ended first and second output signals to the first and second interface circuits, respectively, if the first control signal is in the first control state, and to provide the differential first output signal to the first and second interface circuits if the first control signal is in the second control state.

9. The data transfer device of claim 8, wherein the single-ended input comprises first and second single-ended inputs, wherein the first input buffer is operative to provide a first input data representative of the first single-ended input if the first control signal is in the first control state, and to provide the first input data representative of the differential input if the first control signal is in the second control state, and wherein the second input buffer is operative to provide a second input data representative of the second single-ended input if the first control signal is in the first control state.

10. The data transfer device of claim 9, wherein the input circuit comprises a second switching circuit operative according to the first control signal to provide the first and second single-ended inputs from the first and second interface circuits to the first and second input buffers, respectively, if the first control signal is in the first control state, and to provide the differential input from the first and second interface circuits to the first input buffer if the first control signal is in the second control state.

11. The data transfer device of claim 10, wherein the output circuit is operative to provide the first and second output signals if a second control signal is in an output state, and wherein the input circuit is operative to provide the first and second input data if the second control signal is in an input state.

12. The data transfer device of claim 10, wherein the first control signal is provided by the host interface.

13. The data transfer device of claim 1, wherein the single-ended input comprises first and second single-ended inputs, wherein the first input buffer is operative to provide a first input data representative of the first single-ended input if the first control signal is in the first control state, and to provide the first input data representative of the differential input if the first control signal is in the second control state, and wherein the second input buffer is operative to provide a second Input data representative of the second single-ended input if the first control signal is in the first control state.

14. The data transfer device of claim 13, further comprising a host interface having first and second interface circuits operative to provide electrical communication between the data transfer device and the host computer, and wherein the input circuit comprises a second switching circuit operative according to the first control signal to provide the first and second single-ended inputs from the first and second interface circuits to the first and second input buffers, respectively, if the first control signal is in the first control state, and to provide the differential input from the first and second interface circuits to the first input buffer if the first control signal is in the second control state.

15. The data transfer device of claim 1, wherein the peripheral storage device comprises one of a disk drive, a CDROM drive, and a tape drive.

16. A peripheral storage device system for providing information storage for a host computer, comprising:

a peripheral storage device operative to store information from the host computer;

a host interface operative to provide electrical communication between the peripheral storage device and the host computer; and a data transfer device associated with the host interface and operative to selectively transfer information between the peripheral storage device and the host computer in one of a serial format and a parallel format, wherein the data transfer device comprises:

an output circuit operative to receive output information including first and second output data from the peripheral storage device and to selectively provide one of a single-ended output representative of the output information and a differential output representative of the output information to the host computer according to a first control signal; and an input circuit operative to selectively receive one of a single-ended input and a differential input from the host computer according to the first control signal and to provide input information representative of the one of a single-ended input and a differential input to the peripheral storage device, wherein the output circuit comprises first and second output buffers operative to receive the first and second output data, respectively, from the peripheral storage device and to provide first and second output signals representative of the first and second output data, respectively, according to the first control signal and wherein the input circuit comprises first and second input buffers operative to receive first and second input signals, respectively, and to selectively provide single-ended and differential input data representative of the first and second input signals, respectively, to the peripheral storage device according to the first control signal.

17. The peripheral storage device system of claim 16, wherein the output circuit is operative to selectively provide one of a single-ended output representative of the first and second output data and a differential output representative of the first output data according to the first control signal.

18. The peripheral storage device system of claim 17, wherein the input information comprises one of single-ended Input data and differential input data, and wherein the input circuit is operative to selectively provide one of the single-ended input data representative of the single-ended input and the differential input data representative of the differential input according to the first control signal.

19. The peripheral storage device system of claim 18, wherein the first control signal comprises one of a first control state and a second control state;

wherein the output circuit is operative to provide the single-ended output representative of the first and second output data if the first control signal is in the first control state, and to provide the differential output representative of the first output data if the first control signal is in the second control state; and wherein the input circuit is operative to provide the single-ended input data representative of a single-ended input if the first control signal is in the first control state, and to provide the differential input data representative of a differential input if the first control signal is in the second control state.

20. The peripheral storage device system of claim 19, wherein the first control signal is provided by the host interface.

21. The peripheral storage device system of claim 16, wherein the first output buffer is operative to provide a single-ended first output signal representative of the first output data if the first control signal is in the first control state, and a differential first output signal representative of the first output data when the first control signal is in the second control state, and wherein the second output buffer is operative to provide a single-ended second output signal representative of the second output data if the first control signal is in the first control state.

22. The peripheral storage device system of claim 21, wherein the host interface comprises first and second interface circuits operative to provide electrical communication between the data transfer device and the host computer, and wherein the output circuit comprises a first switching circuit operative according to the first control signal to provide the single-ended first and second output signals to the first and second interface circuits, respectively, if the first control signal is in the first control state, and to provide the differential first output signal to the first and second interface circuits if the first control signal is in the second control state.

23. The peripheral storage device system of claim 22, wherein the single-ended input comprises first and second single-ended inputs, wherein the first input buffer is operative to provide a first input data representative of the first single-ended input if the first control signal is in the first control state, and to provide the first input data representative of the differential input if the first control signal is in the second control state, and wherein the second input buffer is operative to provide a second input data representative of the second single-ended input if the first control signal is in the first control state.

24. The peripheral storage device system of claim 23, wherein the input circuit comprises a second switching circuit operative according to the first control signal to provide the first and second single-ended inputs from the first and second interface circuits to the first and second input buffers, respectively, if the first control signal is in the first control state, and to provide the differential input from the first and second interface circuits to the first input buffer if the first control signal is in the second control state.

25. The peripheral storage device system of claim 24, wherein the output circuit is operative to provide the first and second output signals if a second control signal is in an output state, and wherein the input circuit is operative to provide the first and second input data if the second control signal is in an input state.

26. The peripheral storage device system of claim 25, wherein the host interface comprises an ATA connector operative to provide electrical communication between the peripheral storage device system and the host computer in one of a serial format and a parallel format.

27. The peripheral storage device system of claim 16, wherein the host interface comprises an ATA connector operative to provide electrical communication between the peripheral storage device system and the host computer in one of a serial format and a parallel format.

28. The peripheral storage device system of claim 16, wherein the peripheral storage device comprises one of a disk drive, a CDROM drive, and a tape drive.

* * * * *